(12) United States Patent
Cho (10) Patent No.: US 9,462,474 B2
(45) Date of Patent: Oct. 4, 2016

(54) METHOD OF UNLOCKING MOBILE TERMINAL, AND THE MOBILE TERMINAL

(71) Applicant: Samsung Electronics Co., Ltd., Gyeonggi-do (KR)

(72) Inventor: Shi-Yun Cho, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 180 days.

(21) Appl. No.: 14/013,689

(22) Filed: Aug. 29, 2013

(65) Prior Publication Data

US 2014/0066017 A1 Mar. 6, 2014

(30) Foreign Application Priority Data

Sep. 3, 2012 (KR) ........................ 10-2012-0097132

(51) Int. Cl.
*H04W 12/08* (2009.01)
*H04L 29/06* (2006.01)
*H04W 12/06* (2009.01)
*H04M 1/725* (2006.01)
*G06F 3/0488* (2013.01)
*H04M 1/67* (2006.01)

(52) U.S. Cl.
CPC .......... *H04W 12/08* (2013.01); *G06F 3/04883* (2013.01); *H04L 63/168* (2013.01); *H04M 1/72519* (2013.01); *H04W 12/06* (2013.01); *H04M 1/67* (2013.01); *H04M 2250/22* (2013.01)

(58) Field of Classification Search
CPC ...... G06F 21/82; G06F 3/04883; G06F 9/00; H04L 63/168; H04L 67/04; H04M 1/67; H04M 1/72519; H04M 2250/22; H04W 12/06; H04W 12/08; G07C 9/00087
USPC ................ 455/411, 90.1; 715/863; 713/182; 345/156; 340/5.83
See application file for complete search history.

(56) References Cited

U.S. PATENT DOCUMENTS

| 7,657,849 | B2 | 2/2010 | Chaudhri et al. | |
| 8,046,721 | B2 | 10/2011 | Chaudhri et al. | |
| 8,286,103 | B2 * | 10/2012 | Chaudhri | G06F 3/04883 345/15 |
| 2010/0225443 | A1 * | 9/2010 | Bayram | G06F 21/316 340/5.83 |

* cited by examiner

*Primary Examiner* — Kamran Afshar
*Assistant Examiner* — Farid Seyedvosoghi
(74) *Attorney, Agent, or Firm* — The Farrell Law Firm, P.C.

(57) ABSTRACT

An unlock method for conveniently releasing a lock mode of a mobile terminal includes tracking a trajectory corresponding to a touch-and-drag operation of touching the touch screen and then dragging when the mobile terminal is in a lock mode, determining whether one or more intersections occur on the trajectory, and releasing the lock mode if one or more intersections occur on the trajectory. Accordingly, a touch input pattern for unlocking a lock mode is unlimited in terms of size, location, and pattern so that a user can freely touch the touch screen to release the lock mode.

13 Claims, 8 Drawing Sheets

FIG.8

METHOD OF UNLOCKING MOBILE TERMINAL, AND THE MOBILE TERMINAL

PRIORITY

This application claims priority under 35 U.S.C. §119(a) to a Korean patent application filed on Sep. 3, 2012 in the Korean Intellectual Property Office and assigned Serial No. 10-2012-0097132, the contents of which are incorporated herein by reference.

BACKGROUND OF THE INVENTION

1. Field of the Invention

The present invention relates generally to a method and apparatus for unlocking a terminal, and more particularly, to a method and apparatus for easily unlocking a mobile terminal.

2. Description of the Related Art

The recent development of communication technology has resulted in mobile terminals being adapted to serve many functions. Accordingly, various User Interfaces (UIs) and functions based thereon are being provided.

Particularly, mobile terminals with touch screens have various types of lock/unlock functions in order to limit undesired input errors in a sleep mode or to prevent other users from using the mobile terminals. In general, a mobile terminal performs a lock function when a lock activation has been selected by a user.

The mobile terminal activates the lock function when there is no input from the user for a time period. Accordingly, if there is no input from the user for the time period although the user is using a specific function of the mobile terminal, the screen or function of the mobile terminal is deactivated. Generally, a mobile terminal releases a lock mode, such as a touch screen hold status, using a method.

Figure 1:
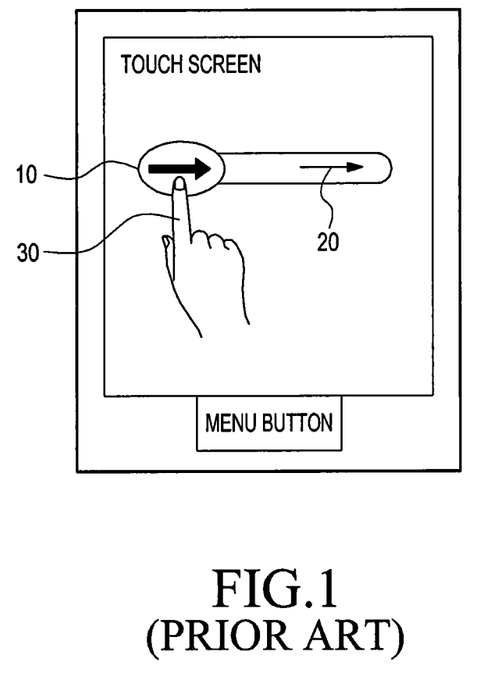
FIG. 1 illustrates a screen of a mobile terminal using conventional slide-to-unlock.

An example of a method of releasing a lock mode is slide-to-unlock, which is illustrated in FIG. 1.

Referring to FIG. 1, a user touches a touch screen of a mobile terminal to start an unlock operation. The user touches a leftmost location of a unlock image 10 displayed on a touch screen, and then moves his/her fingertip to a right direction 20 while maintaining contact with the unlock image 10 to thereby complete the unlock operation.

As such, an unlock operation is completed in the slide-to-unlock, by moving a touch input along a path starting from a particular location.

The mobile terminal activates the lock function whenever there is no input from a user for a waiting time period. For example, a mobile terminal may not receive a key input from a user for a time period when the user is viewing content on a web site. In this case, the mobile terminal determines that there is no input from a user, and deactivates its screen and functions although the user is using a specific function. In order for the user to re-activate the specific function, the user should release the lock function using a preset method, which is cumbersome.

Accordingly, a method for easily releasing the lock function is needed.

In addition, the unlock operation fails if a user's fingertip deviates from the path in the slide-to-unlock, causing the user to have to re-slide his/her fingertip on the unlock image 10 starting from the leftmost location of the unlock image 10. If the user releases the lock mode of the mobile terminal while no function of the mobile terminal is being used, the mobile terminal will return to a main menu. Accordingly, when the user wants to use a specific function of the mobile terminal after releasing the lock mode, the user has to perform a procedure for entering a menu for executing the specific function.

Accordingly, a method capable of easily unlocking a mobile terminal while preventing undesired input errors, which is an original purpose of a lock function, is needed, and if a method capable of easily unlocking a mobile terminal and directly jumping to a desired function is implemented, a user-friendly UI can be provided.

SUMMARY OF THE INVENTION

Aspects of the present invention are to address at least the above-mentioned problems and/or disadvantages and to provide at least the advantages described below.

Accordingly, an aspect of the present invention is to provide a method and apparatus for conventionally releasing a lock mode of a mobile terminal.

Another aspect of the present invention is to provide a method and apparatus for directly jumping to a user's desired function after releasing a lock mode.

In accordance with an aspect of the present invention, there is provided a unlock method which is performed in a mobile terminal with a touch screen, the method including tracking a trajectory corresponding to a touch-and-drag operation of touching the touch screen and then dragging when the mobile terminal is in a lock mode, determining whether one or more intersections occur on the trajectory, and releasing the lock mode if one or more intersections occur on the trajectory.

In accordance with another aspect of the present invention, there is provided a unlock method which is performed in a mobile terminal with a touch screen, the method including outputting an incoming call screen on the touch screen if an incoming call is received, tracking a trajectory corresponding to a touch-and-drag operation of touching the touch screen and then dragging, determining whether one or more intersections occur on the trajectory, and determining whether or not to set up a call connection if one or more intersections occur on the trajectory.

In accordance with another aspect of the present invention, there is provided a mobile terminal with a lock/unlock function, the mobile terminal including a touch screen configured to output a lock screen when the mobile terminal is in a lock mode, a touch screen controller configured to receive a signal corresponding to a trajectory of a touch-and-drag operation of touching the touch screen and then dragging, through the touch screen, and to output the received signal as a digital signal including coordinate values of the trajectory, and a controller configured to receive the digital signal from the touch screen controller, determine whether one or more intersections occur on the trajectory based on the coordinate values of the trajectory included in the digital signal, and release the lock mode if one or more intersections occur on the trajectory.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE INVENTION

The following description with reference to the accompanying drawings is provided to assist in a comprehensive understanding of embodiments of the invention as defined by the claims and their equivalents. It includes various specific details to assist in that understanding but these are to be regarded as merely examples. Accordingly, those of ordinary skill in the art will recognize that various changes and modifications of the embodiments described herein can be made without departing from the scope and spirit of the invention. In addition, descriptions of well-known functions and constructions may be omitted for the sake of clarity and conciseness.

Herein, the touch input of touching the touch screen to release the lock mode has no limitation in size, location, and pattern so that a user can freely touch the touch screen to release the lock mode.

Prior to describing embodiments of the present invention, a touch input pattern is defined as follows. A touch input pattern is drawn on a touch screen when a touch-and-drag operation is performed on the touch screen. That is, a touch input pattern refers to a pattern along which a touch location moves. Particularly, a touch input pattern that is used in embodiments of the present invention is a closed surface created when one or more intersections occur on a touch input trajectory. Accordingly, by dragging a touch input to draw a closed surface with at least one intersection, a user may intuitively release a lock mode through a simple touch-and-drag operation.

Hereinafter, the operation and components of a mobile terminal with the unlock function as described above will be described with reference to FIG. 2. The mobile terminal includes various types of mobile devices requiring a lock function, such as a smart phone, a mobile phone, a tablet Personal Computer (PC), a digital camera, a Motion Pictures Experts Group (MPEG) Audio Layer 3 (MP3) player, a game, and a display device.

Figure 2:
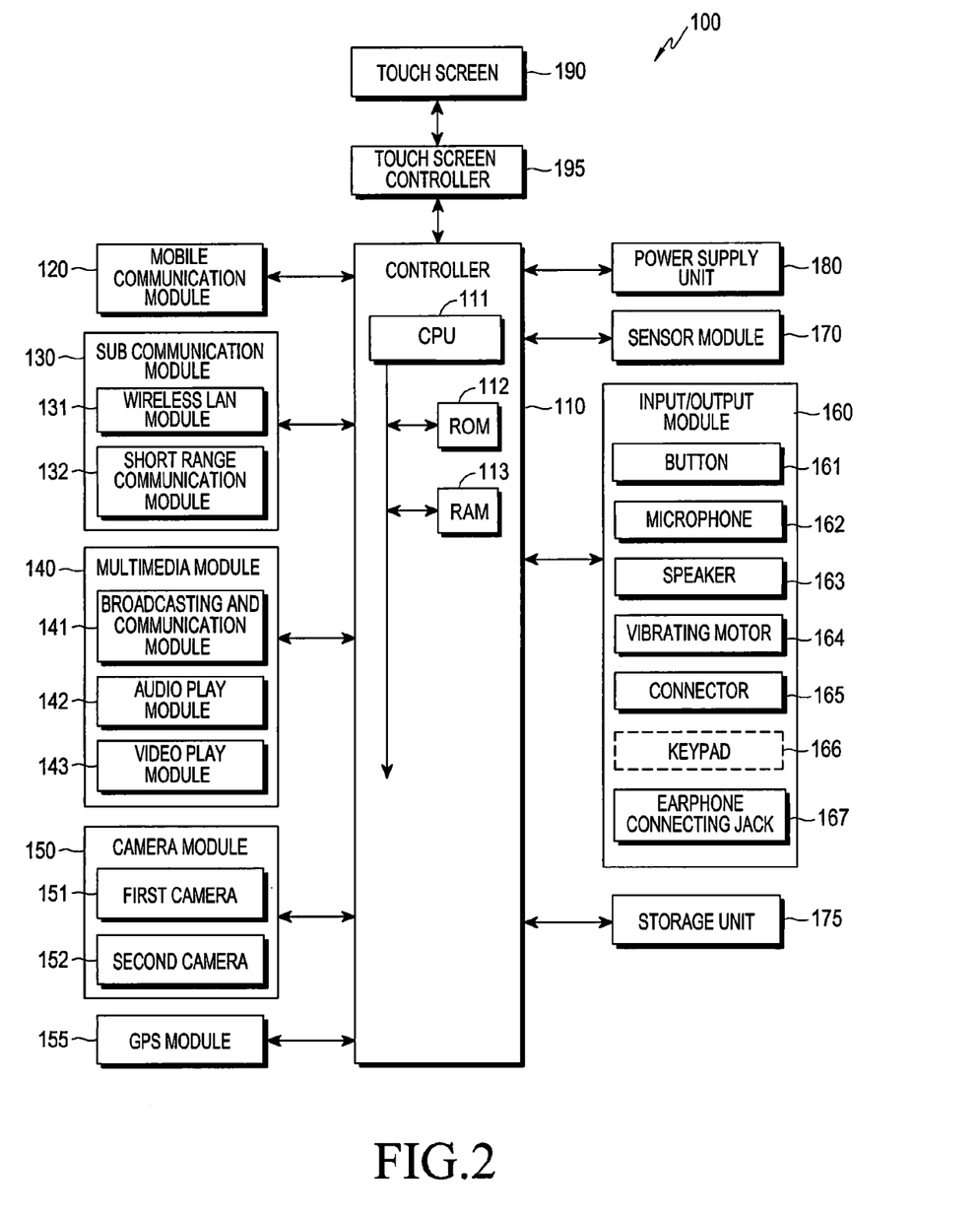
FIG. 2 illustrates a mobile terminal according to an embodiment of the present invention.

FIG. 2 illustrates a mobile terminal according to an embodiment of the present invention.

Referring to FIG. 2, a mobile terminal 100 may connect to an external device (not shown) using a mobile communication module 120, a sub communication module 130, and a connector 165. The external device includes another device, a mobile phone, a smart phone, a tablet PC, and a server.

The mobile terminal 100 includes a display unit and a display controller. The display unit may be implemented as a Liquid Crystal Display (LCD) panel. If the LCD panel is a touch screen, the display unit operates as an input unit. In the present embodiment, it is assumed that the display unit and the display controller are a touch screen 190 and a touch screen controller 195, respectively.

The mobile terminal 100 further includes a controller 110, a mobile communication module 120, a sub communication module 130, a multimedia module 140, a camera module 150, an input/output module 160, a sensor module 170, a storage unit 175, and a power supply unit 180. The sub communication module 130 includes one or both of a wireless Local Area Network (LAN) module 131 and a short-range communication module 132, and the multimedia module 140 includes at least one of a broadcasting and communication module 141, an audio play module 142 and a video play module 143. The input/output module 160 includes at least one of a plurality of buttons 161, a microphone 162, a speaker 163, a vibration motor 165, a connector 165, a keypad 166, and an earphone-connecting jack 167.

The controller 110 may control the mobile communication module 120, the sub communication module 130, the multimedia module 140, the input/output module 160, the sensor module 170, the storage unit 175, the power supply unit 180, the touch screen 190, and the touch screen controller 195.

The controller 110 includes a Central Processing Unit (CPU), and the like, and determines whether to release a lock mode according to a touch input pattern transferred from the touch screen 190 when the mobile terminal is in the lock mode. Specifically, in order to determine whether a closed surface with at least one intersection has been drawn, the controller 110 tracks a trajectory according to a touch input on the touch screen 190 to determine whether one or more intersections exist on the trajectory.

For the operation, the controller 110 detects coordinates at which a touch by a user is sensed on the touch screen 190, and determines a location of the touch based on the detected coordinates. Successively, if the user drags from the touched location on the touch screen 190, the controller 110 tracks a trajectory drawn by the drag operation, and determines whether overlapping coordinates exist on a path (also referred to as a touch input pattern) corresponding to the trajectory. That is, the controller 110 determines whether one or more intersections exist on the touch input pattern. If one or more intersections exist on the touch input pattern, the controller 110 releases a lock mode and/or executes the corresponding function according to the touch input pattern. An operation of releasing a lock mode and/or executing the corresponding function when a touch input pattern with an intersection is drawn will be described in more detail later herein.

The mobile communication module 120 connects the mobile terminal 100 to an external device through mobile communication using at least one antenna (not shown) under the control of the controller 110. The mobile communication module 120 transmits/receives radio signals for voice calls, video calls, Short Message Service (SMS), or Multimedia Messaging Service (MMS) with a mobile phone (not shown), a smart phone, a table PC (not shown), or another device (not shown) having a phone number input to the mobile terminal 100, to/from the mobile terminal 100.

The wireless LAN module 131 may connect to the Internet at a place in which a wireless Access Point (AP) is installed, under the control of the controller 110. The wireless LAN module 131 supports IEEE802.11x. The short-range communication module 132 may perform short-range communication in a wireless manner between the mobile terminal 100 and an imaging device (not shown) under the control of the controller 110. For example, the short-range communication may include Bluetooth®, Infrared Data Association (IrDA), WiFi-Direct, and Near Field Communication (NFC).

The mobile communication may include at least one of the mobile communication module 120, the wireless LAN module 131, and the short-range communication module 132 according to performance. For example, the mobile communication module 100 may include a combination of the mobile communication module 120, the wireless LAN module 131, and the short-range communication module 132, according to performance.

The multimedia module 140 may include, as described above, the broadcasting and communication module 141, the audio play module 142, or the video play module 143. The broadcasting and communication module 141 may receive a broadcasting signal (for example, a TV broadcasting signal, a radio broadcasting signal, or a data broadcasting signal) and broadcasting additional information (for example, an Electric Program Guide (EPS) or an Electric Service Guide (ESG)) transmitted from a broadcasting station through a broadcasting and communication antenna (not shown), under the control of the controller 110.

For example, the audio play module 142 may reproduce a digital audio file (for example, a file having the filename extension of ".mp3", ".wma", ".ogg", or ".wav") that is stored or received under the control of the controller 110. When a media object is selected, the controller 110 may play music corresponding to the selected media object through the audio play module 142. The video play module 143 may reproduce a digital video file (for example, a file having the filename extension of ".mpeg", ".mpg" ".mp4", ".avi", ".mov", or ".mkv") or a digital audio file that is stored or received under the control of the controller 110.

The multimedia module 140 may include only the audio play module 142 and the video play module 143. The audio play module 142 and the video play module 143 may be included in the controller 100.

The camera module 150 may include at least one of a first camera 151 and a second camera 152 for photographing still images or moving images under the control of the controller 110. The first camera 151 or the second camera 152 may include an additional light source (for example, a flash (not shown)) for providing an amount of light required for photographing. The first camera 151 may be disposed in the front of the mobile terminal 100, and the second camera 152 may be disposed in the rear of the mobile terminal 100. Alternatively, the first and second cameras 151 and 152 may be disposed adjacent to each other on the same side, to photograph 3-dimensional (3D) still images and 3D moving images, wherein an interval between the first and second cameras 151 and 152 may be in the range of 1 cm to 8 cm.

A Global Positioning System (GPS) module 155 may receive radio waves from a plurality of earth-orbiting GPS satellites (not shown), and calculate a position of the mobile terminal 100 using a time of arrival taken for the radio waves from the GPS satellites to arrive at the mobile terminal 100.

The input/output module 160 may include, as described above, at least one of the plurality of buttons 161, the microphone 162, the speaker 163, the vibration motor 164, the connector 165, the keypad 166, and the earphone-connecting jack 167.

The buttons 161 may be provided in the front, side, and/or rear of the housing of the mobile terminal 100, and may include at least one of home, menu, back, volume, and power/lock buttons.

The microphone 162 receives voice or sound under the control of the controller 110 to generate an electrical signal.

The speaker 163 may receive various signals (such as radio and broadcasting signals, digital audio and video files, or a photo file) from the mobile communication module 120, the sub communication module 130, and the multimedia module 140, and output sound corresponding to the various signals to the outside of the mobile terminal 100. The speaker 163 may output sound (such as button or currency connection sounds) corresponding to a function that is performed by the mobile terminal 100. The speaker 163 may be provided as one or more units at an appropriate location on the housing of the mobile terminal 100.

The vibration motor 164 may convert an electrical signal into mechanical vibration under the control of the controller 110. For example, when the mobile terminal 100 is in a vibration mode, the vibration motor 164 operates when a voice call is received from another device (not shown). The vibration motor 164 may be provided as one or more units in the housing of the mobile terminal 100, and may operate in response to a user's touch operation (or touching and dragging) on the touch screen 190.

The connector 165 may be used as an interface for connecting the mobile terminal 100 to an external device (not shown) or a power source (not shown). Data stored in the storage unit 175 of the mobile terminal 100 may be transmitted to an external device (not shown) through a wired cable connected to the connector 165 under the control of the controller 110, or data of an external device (not shown) may be received through the wired cable connected to the connector 165, and stored in the storage unit 175 under the control of the controller 110. The mobile terminal 100 may receive power or charge a battery from a power source (not shown) through the wired cable connected to the connector 165.

The keypad 166 may receive a key input from a user in order to control the mobile terminal 100. The keypad 166 includes a physical keypad (not shown) that is provided on the mobile terminal 100, or a virtual keypad (not shown) that is displayed on the touch screen 190. The mobile terminal 100 may be designed so as not to include a physical keypad.

The sensor module 170 includes at least one sensor for detecting a status of the mobile terminal 100. For example, the sensor module 170 may include a proximity sensor for determining whether a user approaches the mobile terminal 100, a geomagnetic sensor for measuring a degree of tilting of the mobile terminal 100, and a motion sensor for detecting motion of the mobile terminal 100. At least one sensor among the above-mentioned sensors may detect a state of the mobile terminal 100, and generate and transfer a signal corresponding to the detected state to the controller 110. The sensor 170 may further include other sensors than the above-mentioned sensors according to the performance of the mobile terminal 100.

The storage unit 175 may store signals or data that is input/output according to operations of the mobile communication module 120, the sub communication module 130, the multimedia module 140, the input/output module 160, the sensor module 170, and the touch screen 190, under the control of the controller 110. The storage unit 175 may store control programs and applications for controlling the mobile terminal 100 or the controller 110.

In this disclosure, the term a "storage unit" includes the storage unit 175, a Read-Only Memory (ROM) or Random Access Memory (RAM) included in the controller 110, and a memory card (not shown) installed in the mobile terminal 100. The storage unit may include a non-volatile memory, a volatile memory, a Hard Disk Drive (HDD), or a Solid State Drive (SSD).

The power supply unit 180 may supply power to one or more batteries (not shown) installed in the housing of and supplying power to the mobile terminal, under the control of the controller 110. The power supply unit 180 may supply power received from an external power source (not shown) through the wired cable connected to the connector 165 to the mobile terminal 100.

The touch screen 190 may provide a user with User Interfaces UIs corresponding to various services (such as a call, data transmission, broadcasting, and photographing) The touch screen 190 may transmit an analog signal corresponding to at least one touch operation received through the UI to the touch screen controller 195. The touch screen 190, which may be a resistive, capacitive, infrared, acoustic wave, pressure, or Electro-Magnetic Resonance (EMR) type, may receive at least one input, such as through a user's finger or thumb, an input device such as a stylus pen, or pressure (when the touch screen 190 is a pressure type).

The touch screen 190 may also receive an input corresponding to a touch-and-drag operation. Thus, the touch screen 190 may receive consecutive touch movements, i.e., a touch input pattern. The touch screen 190 may transmit an analog signal corresponding to the touch-and-drag operation to the touch screen controller 195.

The touch screen 190 displays a lock screen when the mobile terminal 100 enters a lock mode. The lock screen may display information about the lock mode so that a user can intuitively recognize the locked state of the mobile terminal 100. For example, an item by which a user can intuitively recognize that a lock function has been set may be displayed on a specific area of the lock screen. By displaying the lock screen, the user can recognize that a touch input is needed to release the locked state of the mobile terminal 100 through the touch screen 190. Accordingly, if the user performs a touch-and-drag operation of touching the touch screen 190, dragging while maintaining contact with the touch screen 190, and then releasing the touch operation, the mobile terminal 100 may recognize coordinates values of a trajectory (i.e, a touch input pattern) corresponding to the touch-and-drag operation.

The mobile terminal 100 ignores the touch input when the touch input pattern has no intersection, and releases the lock mode when the touch input pattern has one or more intersections. If the lock mode is released, the touch screen 190 may display a standby screen, the previous screen, or a screen on which a specific application is executed.

The touch screen controller 195 may convert the analog signal received from the touch screen 190 into a digital signal (for example, X and Y coordinates), and transmit the digital signal to the controller 110. Accordingly, the controller 110 receives output values according to changes in location of a touch input from a location at which the touch input has been first detected to a location at which the touch input is released, from the touch screen controller 195. The output values are digital signals having coordinate values of (X, Y), for example, and the controller 110 may control the touch screen 190 using the digital signal received from the touch screen controller 195. Accordingly, the controller 110 may recognize whether a touch input pattern with at least one intersection is input by a user based on changes of coordinate values (i.e., based on a trajectory) of a touch input. A path corresponding to the touch-and-drag operation may be displayed, and by doing so, a user can correctly draw a closed surface while viewing a trajectory drawn by a touch-and-drag operation.

The touch screen 190 may further include at least two touch screen panels for sensing a touch or approach of a user's body part and an input device, respectively, in order to receive all inputs from the user's body part and the input device. The at least two touch screen panels provide different output values to the touch screen controller 195, which distinguishes the values received from the two touch screen panels to determine whether the values indicate a touch input by the user's body part or a touch input by the input device. For example, the touch screen 190 may be a combination of a capacitive type touch screen panel and an EMR type touch screen panel.

Figure 3:
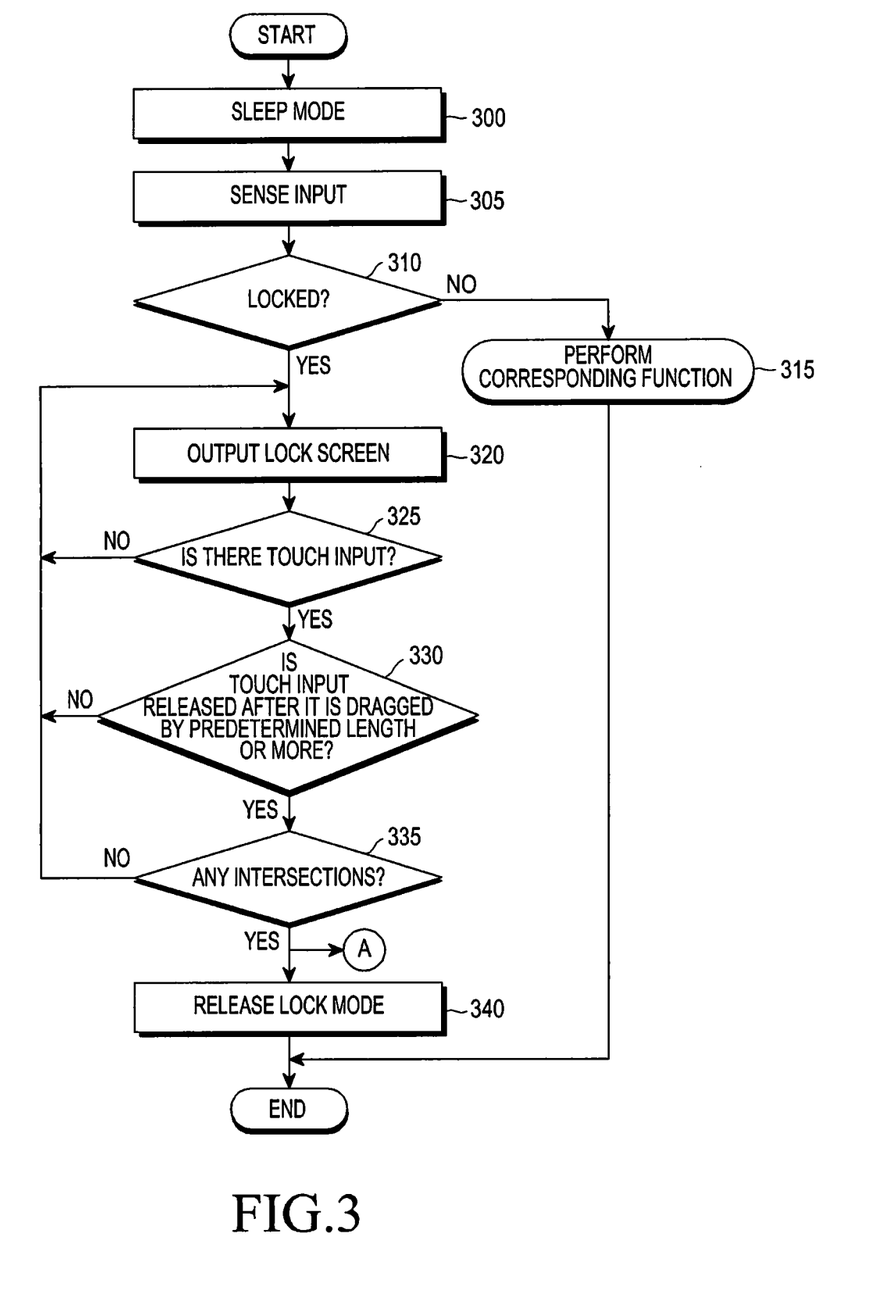
FIG. 3 illustrates a closed surface unlock method for a mobile terminal, according to an embodiment of the present invention.

FIG. 3 illustrates a closed surface unlock method for the mobile terminal 100, according to an embodiment of the present invention.

Referring to FIGS. 2 and 3, if the mobile terminal 100 senses a specific input in a sleep mode 300 at steps 300 and 305, the mobile terminal 100 determines whether the touch screen 190 has been locked at step 310. The mobile terminal 100 measures a waiting time period after a final user input is received. If the measured waiting time period exceeds a time period, the mobile terminal 100 enters a lock mode.

If the mobile terminal 100 is not in the lock mode, the mobile terminal 100 performs a function corresponding to the specific input at step 315. Accordingly, the mobile terminal 100 may activate the touch screen 190 if the mobile terminal 100 senses a specific input through a home button, a power/reset button, and the like, installed in the mobile terminal 100 before the mobile terminal 100 enters a lock mode. For example, the mobile terminal 100 may display a screen such as a main home screen on the touch screen 190, enter a main menu, or maintain a displayed screen, according to the specific input.

If the mobile terminal 100 is in the lock mode, the mobile terminal 100 outputs a lock screen at step 320. The lock screen displays information about the lock mode so that a user can intuitively recognize the locked state of the mobile terminal 100. The mobile terminal 100 activates a touch screen input mode while outputting the lock screen, in order to receive a unlock command. The mobile terminal 100 then determines whether there is a touch input through the touch screen 190 at step 325, and if there is no touch input, the mobile terminal 100 returns to step 320. If there is a touch input, the mobile terminal 100 determines whether there is a touch-and-drag operation of dragging by a length or more after the touch input and then releasing the touch input.

By setting criteria for the length of a path corresponding to the touch-and-drag operation of dragging while maintaining contact with an arbitrary area on the touch screen 190, to a length or more, a touch error may be prevented. The length for preventing a touch error may be set by a manufacturing company of the mobile terminal 100.

If the touch input is released before it is dragged by the set length at step 330, the mobile terminal 100 returns to step 320, and maintains the lock screen. That is, the mobile terminal 100 determines that the touch input does not correspond to a unlock command, and maintains the lock screen. If an operation of dragging by the length or more while maintaining the touch input is performed, the mobile terminal 100 determines whether one or more intersections occur at step 335. If it is determined that one or more intersections occur, the mobile terminal 100 releases the lock mode at step 340. That is, the mobile terminal 100 may release the lock mode, and output a screen or the previous screen. The mobile terminal 100 may determine whether one or more intersections occur by determining whether a touch input event occurs on the touch screen 190 using a digital signal (such as X, Y, and Z coordinates) provided from the touch screen controller 195, and detecting one or more intersections on a trajectory according to the touch input based on the coordinates.

Figure 4:
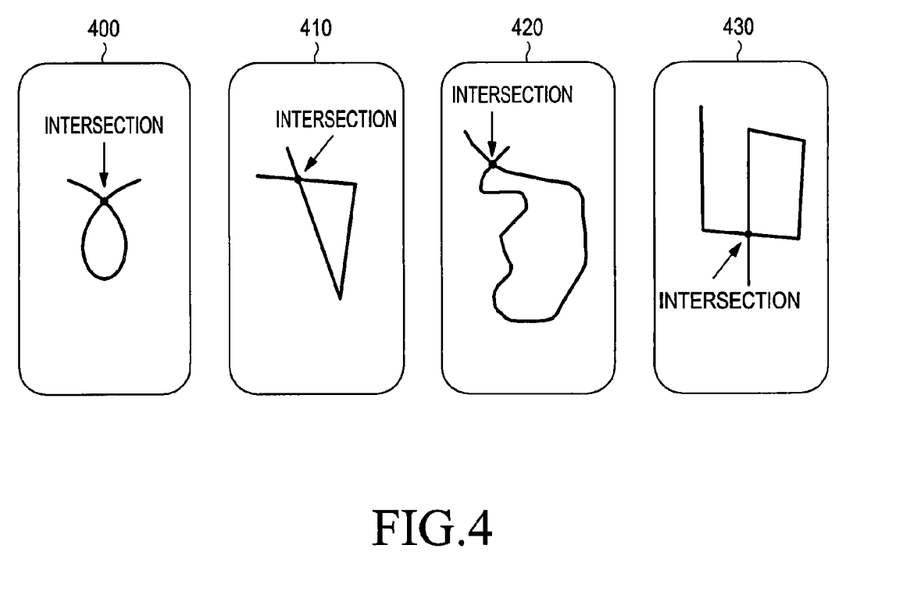
FIG. 4 illustrates screens for describing the closed surface unlock method illustrated in FIG. 3.

FIG. 4 illustrates screens for describing the closed surface unlock method illustrated in FIG. 3. All touch input patterns 400 through 430 illustrated in FIG. 4 may be used as an unlock command. As illustrated in FIG. 4, the mobile terminal 100 releases a lock mode when a user draws a touch input pattern forming a closed surface such that one or more intersections exist on the resultant touch trajectory. Accordingly, the closed surface may be an arbitrary closed figure (420, 430) as well as figures such as an oval 400 or a triangle 410.

The foregoing description with reference to FIGS. 3 and 4 relates to an example in which a lock mode is released when one or more intersections occur. However, the number of intersections may be used as a unlock command. For example, if a user sets a number of intersections for unlock to 3, the mobile terminal 100 may release a lock mode when three intersections occur.

A method of allowing a user to directly execute a desired function using a number of intersections on a touch input trajectory is also provided. Accordingly, a method of mapping numbers of intersections to different functions and executing a function mapped to a number of occurred intersections is disclosed.

Figure 5:
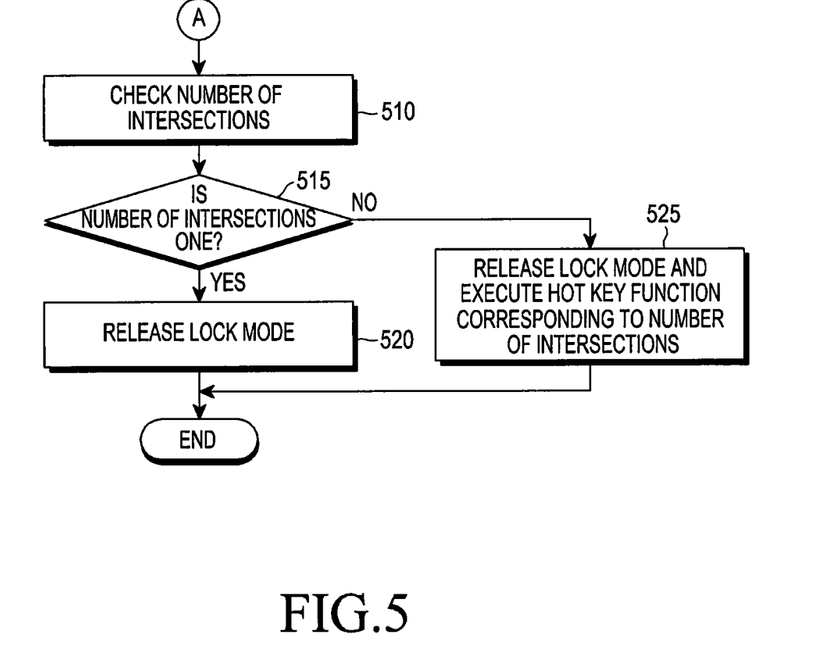
FIG. 5 illustrates a closed surface unlock method for a mobile terminal, according to another embodiment of the present invention.
Figure 6:
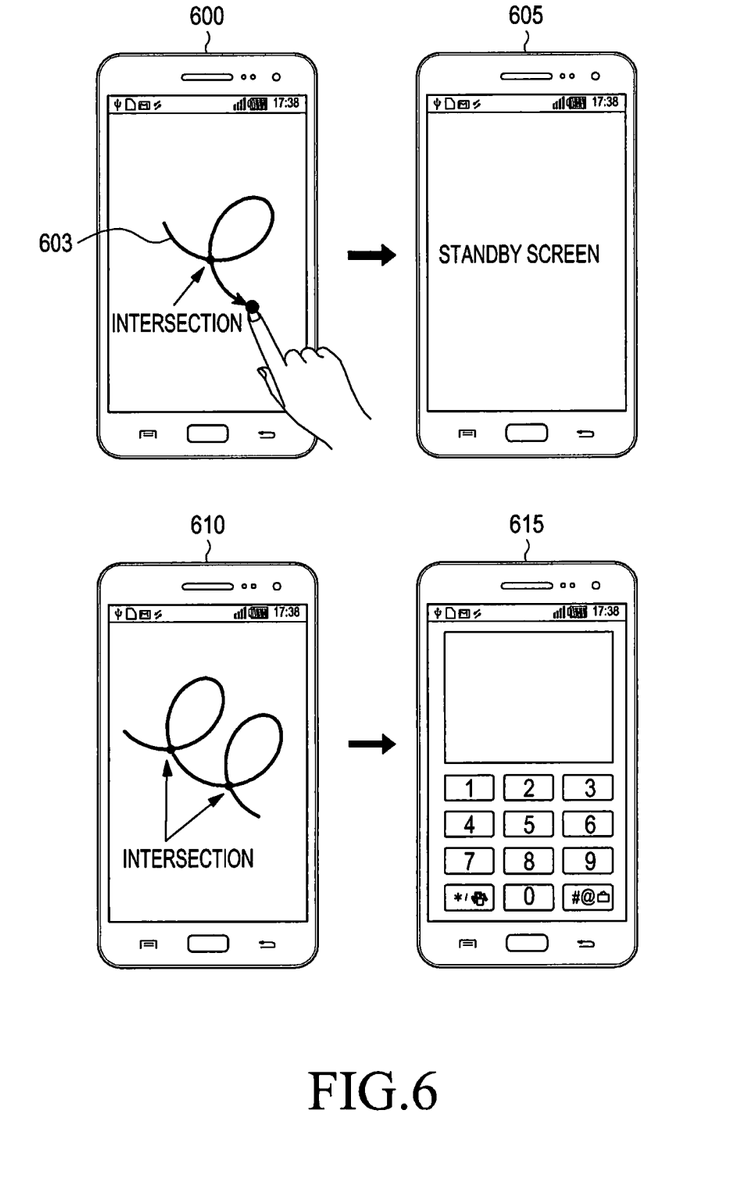
FIG. 6 illustrates screens in which different functions are executed according to numbers of intersections, according to the closed surface unlock method according to the other embodiment of the present invention.

FIG. 5 illustrates a closed surface unlock method for the mobile terminal 100, according to another embodiment of the present invention, and FIG. 6 illustrates screens in which different functions are executed according to numbers of intersections, according to the closed surface unlock method according to the other embodiment of the present invention. Since operations prior to step 510 of FIG. 5 are the same operations as steps 300 to 335 of FIG. 3, a detailed description thereof will be omitted. In order to represent that the method illustrated in FIG. 5 is performed after operation 335 of FIG. 3 when it is determined that one or more intersections occur, a reference symbol "A" is used.

Referring to FIGS. 2, 3, 5, and 6, if a user draws a touch input pattern by a touch-and-drag operation (see the operations of steps 300 to 335 of FIG. 3) to form a closed surface, and then removes a stylus pen or his/her finger from the touch screen 190, the mobile terminal 100 tracks a trajectory corresponding to the touch-and-drag operation to detect whether one or more intersections occur. If it is determined that one or more intersections occur, the mobile terminal 100 determines the number of the intersections at step 510. The mobile terminal 100 then determines whether the number of the intersections is one at step 515. If it is determined that the number of the intersections is one, the mobile terminal 100 releases the lock mode at step 520. For example, if a closed surface unlock command corresponding to a touch-and-drag operation with an intersection is input when a lock screen 600 is displayed as illustrated in FIG. 6, a unlock screen 605 such as a standby screen may be displayed. In this case, a path 603 corresponding to the touch-and-drag operation may be displayed on the touch screen 190 so that the user can recognize whether his/her touch input forms a closed surface.

If the number of the intersections is two or more, the mobile terminal 100 releases the lock mode, and simultaneously executes a hot key function corresponding to the number of the intersections at step 525. That is, the mobile terminal 100 determines whether a function mapped to the number of the intersections exists, and executes the function corresponding to the number of the intersections. For example, if a touch input pattern having a specific number of intersections is input as illustrated in a lock screen 610 of FIG. 6, a call screen 615 including a keypad may be displayed according to the number of the intersections.

The hot key function includes various applications or functions that are provided by the mobile terminal 100, and a specific application or function corresponding to the number of intersections is executed. The specific application or function includes a camera, a phone number list, a message, a call, and various applications or functions that are provided by the mobile terminal 100.

A touch input pattern having a closed surface may be applied to execute various functions other than an unlock function.

Figure 7:
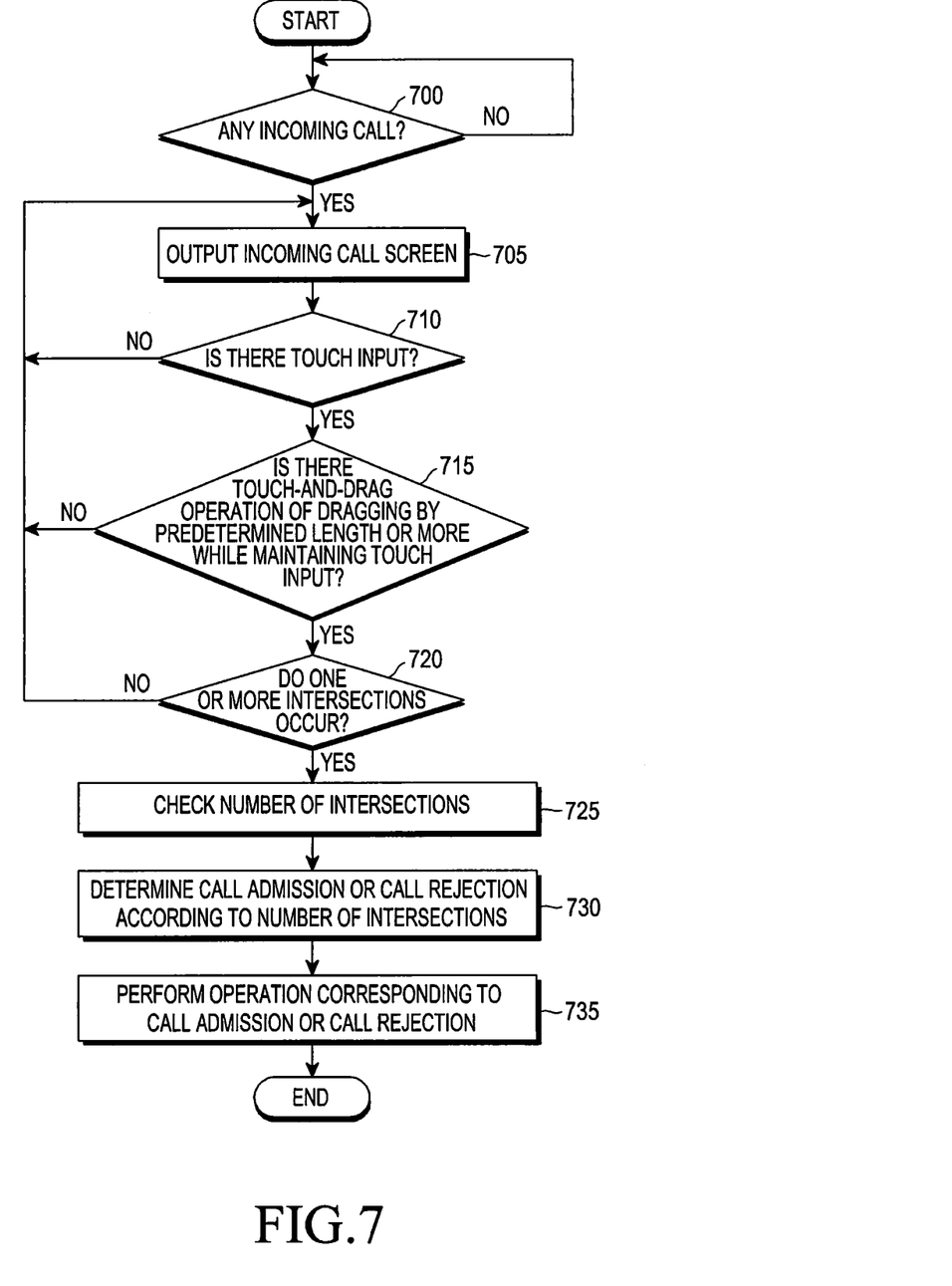
FIG. 7 illustrates a closed surface unlock method which is performed in a mobile terminal when an incoming call is received, according to another embodiment of the present invention.
Figure 8:
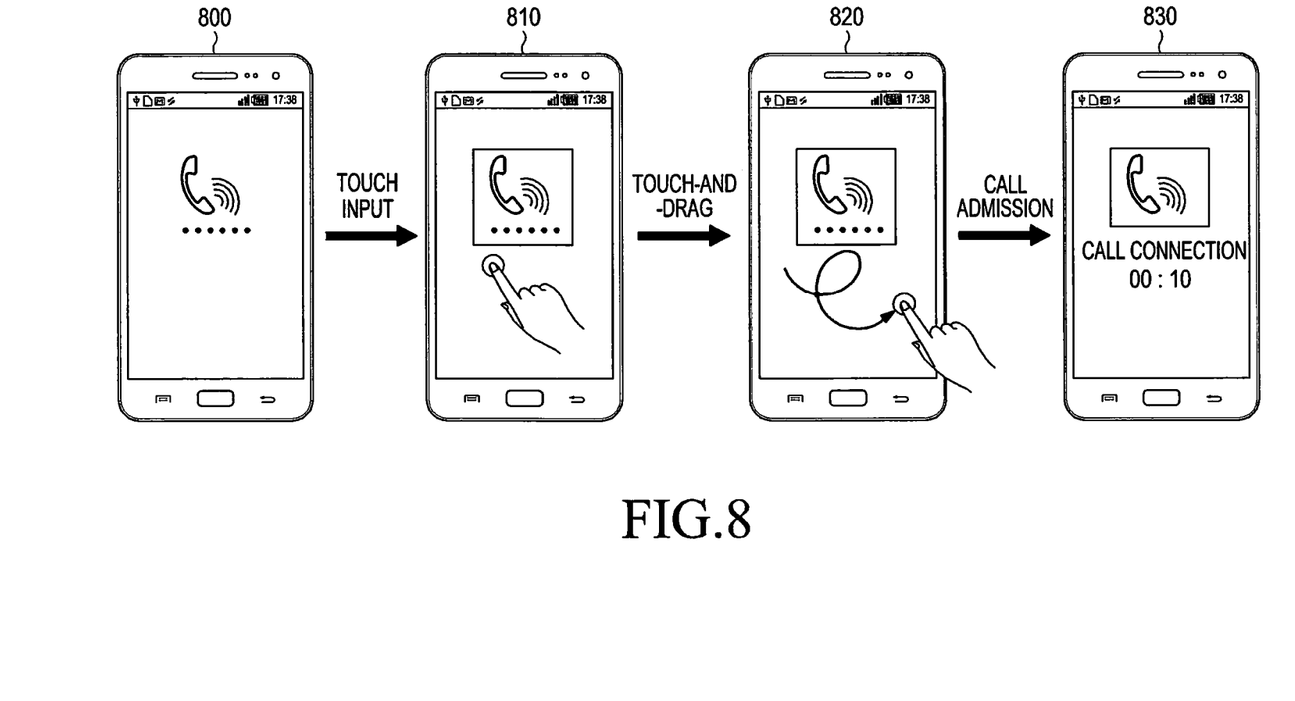
FIG. 8 illustrates screens for describing the closed surface unlock method illustrated in FIG. 7.

FIG. 7 illustrates a closed surface unlock method which is performed in a mobile terminal when an incoming call is received, according to another embodiment of the present invention, and FIG. 8 illustrates screens for describing the closed surface unlock method illustrated in FIG. 7. In the following description, a method in which the mobile terminal 100 executes a function using a closed surface touch input pattern will be described with reference to FIG. 8; however, the method is not limited thereto.

Referring to FIGS. 2, 7, and 8, when an incoming call is received at step 700, the mobile terminal 100 outputs an incoming call screen 800 at step 705. Then, the mobile terminal 100 determines whether there is a touch input through the touch screen 190 while the incoming call screen 800 is displayed at step 710. If it is determined that there is a touch input, the mobile terminal 100 determines whether there is a touch-and-drag operation of dragging by a set length or more while maintaining the touch input at step 715. If there is such a touch-and-drag operation, the mobile terminal 100 determines whether one or more intersections occur on a path corresponding to the touch-and-drag operation at step 720.

If it is determined in step 710 that there is no touch input, in step 715 that the length of the path corresponding to the touch-and-drag operation is not the set length, or in step 720 that no intersection occurs on the path, the mobile terminal 100 maintains the incoming call screen 800. If no closed surface touch input pattern for a call connection is input until a time period elapses, the mobile terminal 100 processes it as call failed. However, if it is determined in operation 720 that one or more intersections occur on the path, the mobile terminal 100 determines the number of the intersections at step 725, determines a call admission or a call rejection according to the number of the intersections at step 730, and performs operation corresponding to the determined call admission or call rejection at step 735.

For example, if a user touches an arbitrary point on the touch screen 190 with a stylus pen or his/her fingertip when the touch screen 190 displays an incoming call screen 810 of FIG. 8, then drags by a set length while continuing to press the touch point, and removes the stylus pen or his/her fingertip from the touch screen 190, the mobile terminal 100 determines whether a touch input pattern according to the touch-and-drag operation forms a closed surface. In other words, the mobile terminal 100 determines whether overlapping coordinates exist on the touch path.

If it is determined that a touch input pattern having a closed surface is input, the mobile terminal 10 displays a call connection screen 830 as illustrated in FIG. 8, and simultaneously performs operation according to the call connection. Accordingly, a user may select a call connection or a call rejection by performing a touch-and-drag operation when an incoming call is received. Numbers of interconnections corresponding to a call connection function and a call rejection function may be set by a manufacturing company of the mobile terminal 100 or by a user. However, a small number of interconnections may be set so that a user can easily set up a call connection. The call rejection function may be set to correspond to a different number of intersections from that set to correspond to the call connection. For example, the user may make a call rejection by drawing a touch input pattern having two intersections.

According to embodiments of the present invention, since all types of closed surfaces, such as a triangle, a circle and an oval, can be recognized as criterion for unlocking a mobile terminal without having to designate a specific path for unlocking the mobile terminal, a user may easily release a lock mode of a mobile terminal. The user may freely touch a touch screen since there is no limitation in terms of size, location, and pattern of a touch input, and since a standby screen is displayed or a specific application is quickly executed according to the number of intersections of a closed surface.

In addition, the user may easily and intuitively use a call function since the user may select a call connection or a call rejection by performing a touch-and-drag operation when an incoming call is received.

Embodiments of the present invention may be implemented in the form of hardware, software, or a combination of hardware and software. The software may be stored in a volatile or non-volatile memory device such as, for example, a ROM, regardless of whether it is erasable or re-writable, in a memory such as, for example, a RAM, a memory chip, and an Integrated Circuit (IC), or in an optically/magnetically recordable and machine-readable storage medium such as, for example, a Compact Disk (CD), a Digital Versatile Disk (DVD), a magnetic disk, and a magnetic tape. A memory that can be included in a mobile terminal is an example of a machine-readable storage medium suitable to store one or more programs, including instructions implementing embodiments of the present invention. Therefore, embodiments of the present invention include programs including codes for implementing the devices and methods as set forth in the appended claims of the specification, and a machine-readable storage medium storing these programs. These programs may be electronically transferred through any media and equivalents thereof, such as communication signals, which are transferred through wired or wireless connections.

The mobile terminal may receive and store the program from a program providing apparatus connected in a wired/wireless manner. The program providing apparatus may include a program including instructions for causing the mobile terminal to perform an unlock method, a memory for storing information, and the like, required for the unlock method, a communication unit for performing wired/wireless communication with the mobile terminal, and a controller for transmitting the corresponding program to the mobile terminal according to a request from the mobile terminal or automatically.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. An unlock method which is performed in a mobile terminal with a touch screen, the method comprising:
    tracking a trajectory corresponding to a touch-and-drag operation of touching the touch screen and then dragging when the mobile terminal is in a lock mode;
    determining whether one or more intersections occur on the trajectory;
    determining, if one or more intersections occur on the trajectory, a number of the intersections; and
    releasing the lock mode and executing a function including one or more applications corresponding to the number of the intersections.

2. The unlock method of claim 1, wherein it is determined whether the one or more intersections occur on the trajectory when the touch-and-drag operation is completed.

3. The unlock method of claim 1, further comprising displaying a lock screen including information about the lock mode on the touch screen to enable user to recognize the lock mode when the mobile terminal is in the lock mode.

4. The unlock method of claim 1, further comprising displaying a path according to the trajectory corresponding to the touch-and-drag operation.

5. The unlock method of claim 1, wherein determining whether the one or more intersections occur on the trajectory comprises detecting coordinates corresponding to the trajectory to determine whether overlapping coordinates exist on the trajectory.

6. An unlock method which is performed in a mobile terminal with a touch screen, the method comprising:
    outputting an incoming call screen on the touch screen if an incoming call is received;
    tracking a trajectory corresponding to a touch-and-drag operation of touching the touch screen and then dragging;
    determining whether one or more intersections occur on the trajectory;
    determining, if one or more intersections occur on the trajectory, a number of the intersections; and
    determining whether to set up a call connection if the one or more intersections occur on the trajectory.

7. The unlock method of claim 6, further comprising:
    executing a call connection function or a call rejection function according to the number of the intersections.

8. The unlock method of claim 7, wherein executing the call connection function or the call rejection function according to the number of the intersections comprises setting up a call connection if the number of the intersections is one.

9. A mobile terminal with a lock/unlock function, the mobile terminal comprising:
    a touch screen configured to output a lock screen when the mobile terminal is in a lock mode;
    a touch screen controller configured to receive a signal corresponding to a trajectory of a touch-and-drag operation of touching the touch screen and then dragging, through the touch screen, and to output the received signal as a digital signal including coordinate values of the trajectory; and
    a controller configured to receive the digital signal from the touch screen controller, determine whether one or more intersections occur on the trajectory based on the coordinate values of the trajectory included in the digital signal, and release the lock mode if the one or more intersections occur on the trajectory, wherein the controller determines, if one or more intersections occur on the trajectory, a number of the intersections, releases the lock mode and executes a function including one or more applications corresponding to the number of the intersections.

10. The mobile terminal of claim 9, wherein the lock screen includes information about the lock mode to enable a user to recognize the lock mode.

11. The mobile terminal of claim 9, wherein the controller displays a path according to the trajectory corresponding to the touch-and-drag operation on the touch screen.

12. The mobile terminal of claim 9, wherein the controller determines whether one or more intersections occur on the trajectory when the touch-and-drag operation is completed.

13. The mobile terminal of claim 9, wherein if an incoming call screen is displayed on the touch screen, the controller tracks a trajectory corresponding to a touch-and-drag operation of touching the touch screen and then dragging, determines whether one or more intersections occur on the trajectory, and sets up a call connection if the one or more intersections occur on the trajectory.

\* \* \* \* \*